United States Patent
White

(10) Patent No.: US 6,428,883 B1
(45) Date of Patent: Aug. 6, 2002

(54) RESINOID DICING BLADE INCLUDING A DRY LUBRICANT

(75) Inventor: Robert M. White, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/310,742

(22) Filed: May 13, 1999

(51) Int. Cl.$^7$ .................................................. B23B 5/16
(52) U.S. Cl. ...................... 428/323; 428/328; 428/329
(58) Field of Search ........................... 428/408, 323, 428/109, 297.4, 328, 329, 295.1

(56) References Cited

U.S. PATENT DOCUMENTS

| | | | |
|---|---|---|---|
| 4,851,371 A | 7/1989 | Fisher et al. | |
| 4,878,992 A | 11/1989 | Campanelli | |
| 5,160,403 A | 11/1992 | Fisher et al. | |
| 5,266,528 A | * 11/1993 | Yamada | 437/226 |
| 5,494,698 A | * 2/1996 | White et al. | 427/295 |
| 5,637,388 A | * 6/1997 | White et al. | 428/109 |

* cited by examiner

*Primary Examiner*—Merrick Dixon
(74) *Attorney, Agent, or Firm*—Oliff & Berridge, PLC

(57) ABSTRACT

A composite resinoid/diamond dicing blade includes diamond particles and a dry lubricant dispersed in a resin binder. The dry lubricant can be in powdered form, and is preferably selected from graphite, talc, molybdenum disulfide, tungsten disulfide, niobium disulfide, boron nitride, and ditellurides and diselenides of group V and VI metals, with molybdenum disulfide being particularly preferred. The dicing blade can be used in cutting a variety of substrates, such as in the production of ink jet printheads, electrical semiconductor chips, raster input scan (RIS) sensor bars, and magnetic heads.

18 Claims, 1 Drawing Sheet

RESINOID DICING BLADE INCLUDING A DRY LUBRICANT

BACKGROUND OF THE INVENTION

1. Field of Invention

This invention relates to precision cutting of discrete devices such as, for example, ink jet printheads and, more particularly, to a resinoid/diamond dicing blade further including a dry lubricant used for said precision cutting. The present invention further relates to a method of making the blade, and a method of using such a blade for precision cutting operations.

2. Description of Related Art

There are many discrete devices that are generally formed as a plurality of substrates integrally formed in a wafer or the like, and which require intermediate cuts and/or separation into individual subunits as a last step in the fabrication process. Examples of such discrete devices are ink jet printheads, magnetic heads, and semiconductor sensor devices. Most, but not all, of the devices are formed in silicon-based wafers. A preferred technique for separating the subunits is to saw through the wafer in a procedure referred to as "dicing." In such dicing operations, the device used to perform the cutting is referred to as a dicing blade or dicing saw. For cutting operations requiring high precision, such as +/−0.5 micron, resinoid/diamond blades have been preferred, especially in the production of thermal ink jet printheads, because they form precisely placed, smooth, chipless cuts.

According to the prior art, resinoid/diamond blades have been typically constructed of a resin-diamond blend. For example, a resinoid/diamond blade is disclosed in U.S. Pat. No. 4,878,992, which is constructed of a relatively hard, dense resin bonded material and a 60 to 90% concentration of natural or synthetic diamonds. Other resinoid/diamond blades and their use are disclosed in U.S. Pat. Nos. 5,160,403, 5,266,528 and 4,851,371.

U.S. Pat. No. 5,160,403 discloses a method of fabricating a semiconductor device having a buttable edge from a first wafer having first and second opposite planar surfaces and a second wafer having first and second opposite planar surfaces. A first component is formed on the first planar surface of the first wafer. A precision dice cut is placed in the first planar surface of the first wafer closely adjacent to the first component. The precision dice cut extends partially through the first surface of the first wafer and defines the buttable edge. The first surface of the first wafer is bonded to the first surface of the second wafer, the first surface of the second wafer containing a second component and being aligned with and bonded to the first wafer so that the first and second components cooperate to form the semiconductor device. Portions of the first and second wafers surrounding the first and second components, respectively, are then removed to define the semiconductor device. The step of removing can include placing a second dice cut entirely through the first and second wafers parallel to and slightly offset from the precision dice cut. The second dice cut being located slightly further away from the first component than the precision dice cut and intersects a portion of the precision dice cut so that a side of the semiconductor device that includes the buttable edge is defined by the precision dice cut and the second dice cut.

U.S. Pat. No. 5,266,528 discloses a method of dicing a semiconductor wafer for dividing a semiconductor wafer having a large number of devices formed thereon in a matrix into a large number of chips by the use of a diamond blade. The method includes the steps of first cutting by the use of the diamond blade in such a manner as to leave a partial residual portion or portions in a direction of thickness of the wafer and to define a plurality of grooves on the wafer in transverse and longitudinal directions, and then cutting the wafer along the grooves by the use of a resin blade having a width equal to or smaller than that of the diamond blade while a feed speed thereof is kept lower than that of the diamond blade. U.S. Pat. No. 4,851,371 discloses a method of fabricating a large array or pagewidth silicon device having high resolution. The pagewidth device is assembled by abutting silicon device sub-units such as image sensors or thermal ink jet printheads. For printheads, the sub-units are fully operational small printheads comprising an ink flow directing channel plate and a heating element plate, which are bonded together. A plurality of individual printhead sub-units are obtained by dicing aligned and bonded channel wafers and heating element wafers. The abutting edges of the printhead sub-units are diced in such a manner that the resulting kerfs have vertical to inwardly directed sides, which enable high tolerance linear abutment of adjacent sub-units. Alternatively, the wafer surface containing the heating elements is first anisotropically etched to form small V-grooves, one wall of which protects against microcracking during the dicing operation. The other wall of the V-groove is obliterated by the slanted dicing blade.

Despite the recent improvements in dicing blade manufacture, the above-described resinoid/diamond blades still suffer from performance variability, generally manifested in wearing down of the blade cutting edge and asymmetric wear of the blade periphery. The dicing blades also generally suffer from shortened blade life due to chipping caused by the forces generated when pieces of silicon or diamond particles loosened from the dicing blade become jammed between the rotating dicing blade and the silicon wafers being cut. The use of natural or synthetic diamonds also adds to the expense.

Several improvements on the known dicing blades have been suggested as means to improve the accuracy and economics of the dicing operations. For example, U.S. Pat. No. 5,637,388 discloses a composite resinoid/graphite/diamond blade having enhanced precision cutting properties. The blade is made by assembling several layers, each layer comprising a veil of non-woven graphite fabric of fibers having an outside diameter of 10 microns, impregnated with a mixture of diamond particles blended into a phenolic resin. The diamond content of the blades was in the order of 100–120% (100%=72 carats/cubic inch). Layers are built up in sandwich fashion. In one described embodiment, four layers are formed and, in a heating compression molding operation, the sandwich is compressed into a composite blade having a diameter of 4.7 inches with a thickness of 0.011 inch. The final blade is formed by a die cut and lapping process. The layered construction is described to yield a blade with more consistent cross-section and improved blade wear symmetry. In another described embodiment, the layers are tailored to have a grit concentration of the diamond/resin mixture at the periphery or cutting edge.

Furthermore, in U.S. Pat. No. 5,494,698 there is disclosed a resinoid/diamond dicing blade having approximately a 20% by volume porosity structure. The structure is coated and impregnated with Teflon® by a process that impregnates the resinoid/diamond blade with Teflon® to about 0.3 to 0.5% by weight. The Teflon® impregnated dicing blade is described to not only reduce nozzle chipping when bonded silicon wafers are separated into a plurality of individual printhead die, but blade life is significantly increased.

Various dicing operations and methods are also known in the art, as described in the above-referenced patents. In addition, U.S. Pat. No. 4,878,992 describes an ink jet printhead fabrication process wherein a plurality of printheads are produced from two mated substrates by two dicing operations. One dicing operation produces the nozzle face for each of a plurality of printheads and optionally produces the nozzles. This dicing blade, together with specific operating parameters, prevent the nozzles from chipping and the nozzle faces from scratches and abrasions. A second dicing operation with a standard dicing blade severs the mated substrates into separate printheads. The dicing operation which produces the nozzle face is preferably conducted in a two-step operation. A first cut makes the nozzle face, but does not sever the two mated substrates. A second dicing cut severs the two substrates, but does so in a manner that prevents contact by the dicing blade with the nozzle face.

SUMMARY OF THE INVENTION

However, a need continues to exist in the ink jet art, and in the semiconductor art in general, for improved dicing blades and dicing operations that provide more precise cuts and more economical dicing processes.

Thus, in embodiments of this invention, the present invention provides a composite resinoid/diamond dicing blade, comprising diamond particles and a dry lubricant dispersed in a resin binder. In other embodiments, the present invention also provides a method of cutting a substrate using a dicing blade, comprising cutting a substrate using the disclosed dicing blade, as well as a method of making such a dicing blade, comprising: providing a mixture of resin, diamond particles, and a dry lubricant; and forming said mixture into a dicing blade.

BRIEF DESCRIPTION OF THE DRAWINGS

These and other advantages and features of this invention will be apparent from the following, especially when considered with the accompanying drawings, in which.

DETAILED DESCRIPTION OF PREFERRED EMBODIMENTS

Figure 1:
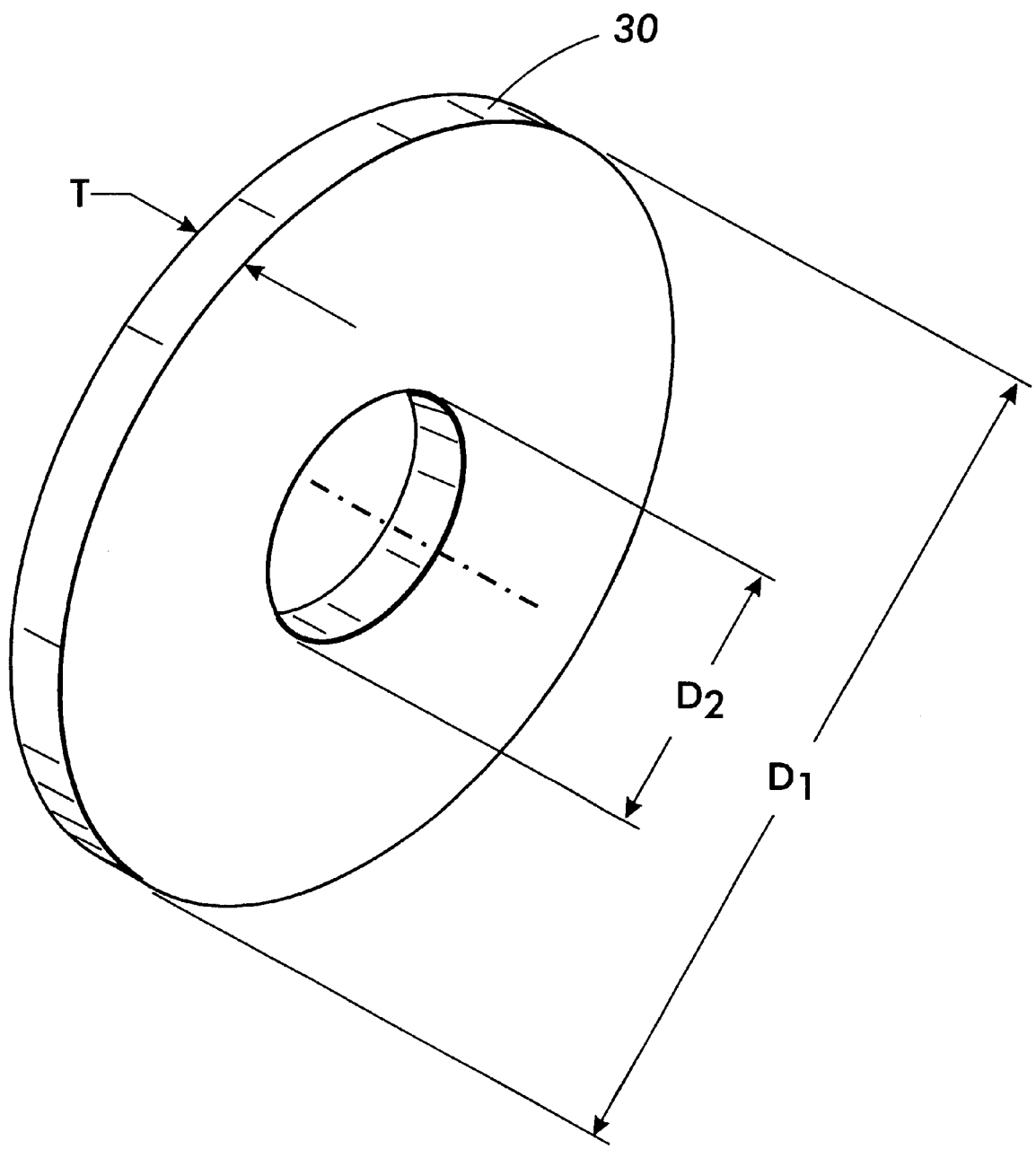
FIG. 1 shows a finished dicing blade according to the present invention.

FIG. 1 shows a dicing blade according to the present invention. The dicing blade 30 is shown as having an outside diameter $D_1$, an inside diameter $D_2$, and a thickness T. Each of these dimensions can be generally varied over wide ranges, depending on the particular application of the particular dicing blade. For example, suitable dicing blades can be produced having a outside diameter ranging from 2.2 inches or smaller, to 4.7 inches or greater. Other blade sizes can readily be produced, without or without this range, by making minor tooling adjustments, as would be readily apparent to those of ordinary skill in the art. Suitable dimensions are disclosed, for example, in U.S. Pat. Nos. 5,637,388 and 5,494,698, the entire disclosures of which are incorporated herein by reference.

According to the present invention, the dicing blade is generally a resinoid/diamond mixture, further comprising an amount of a dry lubricant. The blade has a relatively hard, dense resin bonded base material, preferably with substantially no abrasive fillers, and contains a suitable concentration of natural or synthetic diamonds. Such resinoid/diamond dicing blades are generally known in the art, as disclosed in, for example, U.S. Pat. No. 4,878,992, the entire disclosure of which is incorporated herein by reference.

Although compositions for dicing blades are generally known in the art, an exemplary dicing blade according to the present invention contains graphite, phenolic resin, diamond particles, and dry lubricant. For example, a particular dicing blade can include graphite in an amount of about 7.5% by weight, phenolic resin in an amount of about 32.5% by weight, diamond in an amount of about 55.5% by weight, and molybdenum disulfide in an amount of about 4.5% by weight. Of course, these percentages are not limiting, and the amounts can be varied depending on particular blade designs.

According to the present invention, the dicing blade preferably contains little or no abrasive fillers, and instead has a high density fine diamond distribution in which the diamond acts as the abrasive medium. In embodiments of the present invention, the diamonds may be natural or synthetic, and preferably have a nominal diamond size range of from 1 to 20 micrometers, preferably 1 to 10 micrometers, and more preferably 2 to 6 micrometers. The diamond concentration in the blade is preferably from about 80 to about 140%, more preferably 90 to 130%, and even more preferably 100 to 120%, and still more preferably 105 to 115%, where 100% corresponds to 72 carats/cubic inch. However, as will be apparent to those skilled in the art, the diamond size and concentration can be readily varied based on particular applications of the resultant dicing blade.

Furthermore, to achieve the objects of the present invention, the dicing blade further comprises an effective amount of a dry lubricant, mixed into the resin/diamond material. According to the present invention, any of the various dry lubricants can be used in forming the dicing blade. Dry lubricants generally comprise materials that are fairly inert and that have a lamellar structure that causes them to be lubricious. Suitable dry lubricants include, but are not limited to, graphite, talc, molybdenum disulfide, tungsten disulfide, niobium disulfide, and boron nitride. Other dry lubricant materials such as ditellurides and diselenides of various group V and VI metals can also be employed. Of these, molybdenum disulfide is particularly preferred. In embodiments of the present invention, molybdenum disulfide is particularly preferred as the dry lubricant.

Dry lubricant materials are generally employed in a loose powdered form, or they may be used in combination with a liquid lubricant. Alternatively, if desired, the dry lubricant can be dissolved in a suitable solvent, and a backfilling technique can be used to fill the dry lubricant into the pores of the dicing blade. This technique is described in U.S. Pat. No. 5,494,698, the entire disclosure of which is incorporated herein by reference. Thus, according to the present invention, the dry lubricant can be added to the resinoid/diamond mixture either by itself, or in combination with a suitable liquid lubricant. However, adding the dry lubricant by itself provides a more cost effective process, as additional process steps are not required. Thus, in embodiments of the present invention, it is preferred that the dry lubricant is added to the resinoid/diamond mixture by itself.

According to the present invention, the amount of dry lubricant added to the resin/diamond material should be enough to provide the dicing blade with the desired increased wear properties, but not so much as to interfere with the dicing blade operation. In embodiments, the dry lubricant is included in the dicing blade, or in individual layers or portions of the dicing blade, in an amount of from about 2 to about 10 percent by total weight of the blade, layer or portion. More preferably, the dry lubricant is included in an amount of from about 2 to about 6 percent, even more preferably from about 4 to about 5 percent, by total weight of the blade, layer or portion. However, the dry lubricant content is not limited to these ranges, and amounts outside of these ranges can be used if desired. In particular, while increased amounts of dry lubricant may increase the lubricious properties of the blade, it is believed that too much dry lubricant can deteriorate the blade's structural properties. For example, if too much dry lubricant is added, the structure may become weaker, the blade may wear more, and the blade may in fact not be able to stay together at the high rotation speeds.

As described above, the dry lubricant is usually used in a loose powder form, or mixed with an appropriate liquid lubricant. In embodiments of the present invention, the dry lubricant has a small particle size to permit uniform mixing with the resin/diamond material. Thus, in embodiments, the dry lubricant preferably has an average particle size of from about 0.01 to about 10 microns. More preferably, the average particle size is from about 0.1 to about 5 microns, and more preferably from about 0.5 to about 3 microns. It is particularly preferred that the dry lubricant average particle size is less than about 2 microns.

Furthermore, as will be apparent to those skilled in the art, the dry lubricant can be incorporated into the dicing blade either throughout the entire dicing blade, or only in portions thereof. For example, because only the area near the outer periphery of the blade is generally used in dicing operations, it is acceptable to incorporate the dry lubricant only in outer layers of the blade, or only in the peripheral portions of the blade. Various other profiles for incorporation of the dry lubricant can also be used, as desired. Such suitable profiles include step profiles, where there is a sharp change in the lubricant concentration; and gradient profiles, where the concentration varies over a gradient. Combinations and variations of such profiles are also acceptable.

The dicing blades of the present invention can be made according to any of the various methods known in the art, with the modification of adding a dry lubricant to the blade composition. For example, as described above, the blade can be formed using a backfilling technique, as described in U.S. Pat. No. 5,494,698. Alternatively, the blade can be formed using the process described in U.S. Pat. No. 5,637,388, the entire disclosure of which is incorporated herein by reference, with the modification of merely adding the desired amount of dry lubricant to the blade composition mixture.

Methods of using the dicing blade of the present invention will be readily apparent to those skilled in the art. In particular, the dicing blade of the present invention can be used in any of the various dicing methods practiced (or subsequently developed) in the art.

However, the dicing blade of the present invention provides several significant advantages over prior art dicing blades in such dicing operations. In particular, it has been found that using the dicing blade of the present invention provides significantly decreased wear rates of the dicing blade. For example, comparative use of the dicing blade of the present invention versus a similar dicing blade not including the dry lubricant, shows that the dicing blade of the present invention has as much as a 25% decrease in wear of the blade. This not only provides increased process throughput, but also provides more economical processing due to a lower need to replace the dicing blade. The dicing blade of the present invention also exhibits less asymmetric wear on the periphery of the blade, which in turn provides the benefit of reducing the need to redress the blade during the dicing operation. Less asymmetric wear also results in more consistent dimensional quality of the diced chip.

Furthermore, the dicing blade of the present invention provides more precise cutting with less chipping, both of the dicing blade and of the semiconductor substrate being cut.

Still further, it has been found that the dicing blade of the present invention exhibits less bending during the dicing operation. This allows the dicing operation to provide more precise cuts, an advantage that is becoming more and more important as the size of microelectronics continues to decrease.

While the dicing blade of the present invention has been described as being useful in the fabrication of ink jet printheads, which require wafer cutting and separation, the dicing blade of the present invention can also be used for a variety of precision cutting purposes in other areas. For example, the dicing blades can be used in any of the various operations in the microelectronics area, such as during the fabrication of electrical semiconductor chips or for constructing raster input scan (RIS) sensor bars. The dicing blades can similarly be used in the construction of magnetic heads. For example, the present invention is particularly advantageous in the dicing of microelectronic chips made from gallium arsenide, which tend to chip and break easily in the cutting operations.

The following examples are illustrative of embodiments of the present invention, but are not limiting of the invention. It will be apparent, however, that the invention can be practiced with many different types and amounts of materials and can be used for a variety of different uses in accordance with the disclosure above and as pointed out hereinafter.

EXAMPLES

Examples 1 and 2

Resinoid/diamond dicing blades are formed according to standard procedures, except that the material used to form the dicing blades further includes an amount of molybdenum disulfide as a dry lubricant. The molybdenum disulfide has an average particle size less than 2 microns. The blade of Example 1 has an outer diameter of 4.7 inches; the blade of Example 2 has an outer diameter of 2 inches.

The blades are subsequently used to cut 600 dot per inch (dpi) inkjet dies (polyimide channels). The wear and angle of the blades are measured after first and second wafers, and third wafers in the case of Example 1, are cut. The results of the wear measurements for Example 1 are presented in Table I below; the results of the wear measurements for Example 2 are presented in Table II below.

Comparative Examples 1 and 2

Resinoid/diamond dicing blades are formed according to standard procedures, as in Examples 1 and 2 above, except that no molybdenum disulfide or other dry lubricant is added to the compositions. The blade of Comparative Example 1 has an outer diameter of 4.7 inches; the blade of Comparative Example 2 has an outer diameter of 2 inches. As in Examples 1 and 2, the blades are subsequently used to cut 600 dot per inch (dpi) inkjet dies (polyimide channels). The wear and angle of the blades are measured after first and second wafers, and third wafers in the case of Comparative Example 1, are cut. The results of the wear measurements for Comparative Example 1 are presented in Table I below; the results of the wear measurements for Comparative Example 2 are presented in Table II below.

TABLE I

4.7 Inch Diameter Blades

| | Example 1 | | Comparative Example 1 | |
|---|---|---|---|---|
| | Wear (microns) | Angle (degrees) | Wear (microns) | Angle (degrees) |
| dress | 25 | | 0 | |
| 1st | 1.6 | | 25 | |
| 4 wear | 9.6 | +0.5 degree | 14.7 | +3.5 degrees |
| 2nd | 17.4 | | 1.6 | |
| 4 wear | 19.1 | +1.5 degree | 40 | +3 degrees |
| 3rd | 5.5 | | 25 | |
| Total Wear | 78.2 | | 106.3 | |

TABLE II

2 Inch Diameter Blades

| | Example 2 | | Comparative Example 2 | |
|---|---|---|---|---|
| | Wear (microns) | Angle (degrees) | Wear (microns) | Angle (degrees) |
| dress | 0 | | 0 | |
| 1st | 6 | | 193 | |
| 4 wear | 6 | −1 degree | 37 | −1 degree |
| 2nd | 5 | | 5 | |
| Total Wear | 17 | | 235 | |

As can be seen form the data in Tables I and II, the dicing blades of the present invention provide significantly reduced wear over similar dicing blades that do not include the dry lubricant. The dicing blades of the present invention also exhibit less chipping, have reduced asymmetric wear on the periphery of the blade, and experience less bending in operation.

As will be apparent to one of ordinary skill in the art, numerous changes, alterations and adjustments can be made to the above-described embodiments without departing from the scope of the invention, and the invention is in no way limited to the specific exemplary embodiments described above. One skilled in the art will recognize that the various aspects of the invention discussed above may be selected and adjusted as necessary to achieve specific results for a particular application. Thus, the foregoing embodiments are intended to illustrate and not limit the present invention. It will be apparent that various modifications can be made without departing from the spirit and scope of the invention.

What is claimed is:

1. A composite resinoid/diamond dicing blade, comprising diamond particles and a dry lubricant dispersed in a resin binder and graphite fibers, wherein said dry lubricant is selected from the group consisting of talc, molybdenum disulfide, tungsten disulfide, niobium disulfide, boron nitride, and ditellurides and diselenides of group V and VI metals.

2. The blade of claim 1, wherein said dry lubricant is molybdenum disulfide.

3. The blade of claim 1, wherein said dry lubricant is in a powder form.

4. The blade of claim 1, wherein said dry lubricant has an average particle size of from 0.01 to 10 microns.

5. The blade of claim 1, wherein said dry lubricant has an average particle size of from 0.1 to 5 microns.

6. The blade of claim 1, wherein said dry lubricant has an average particle size less than 2 microns.

7. The blade of claim 1, wherein said dry lubricant is uniformly dispersed throughout an entire mass of said blade.

8. The blade of claim 7, wherein said dry lubricant is included in an amount of from 2 to 6 percent by total weight of said blade.

9. The blade of claim 1, wherein said dry lubricant is dispersed in only a portion of said blade.

10. The blade of claim 9, wherein said dry lubricant is included in an amount of from 2 to 6 percent by total weight of said portion of said blade.

11. The blade of claim 9, wherein said portion is an outer periphery of said blade.

12. The blade of claim 9, wherein said portion is an outer layer of said blade.

13. A method of cutting a substrate using a dicing blade, comprising cutting a substrate using the dicing blade of claim 1.

14. The method according to claim 13, wherein said substrate comprises at least one of ink jet printheads, electrical semiconductor chips, raster input scan sensor bars, and magnetic heads.

15. A method of making a dicing blade, comprising:

providing a mixture of resin, diamond particles, and a dry lubricant; and forming said mixture into a dicing blade, wherein said dry lubricant is selected from the group consisting of talc, molybdenum disulfide, tungsten disulfide, niobium disulfide, boron nitride, and ditellurides and diselenides of group V and VI metals.

16. The method of claim 15, wherein said dry lubricant is in a powder form.

17. The method of claim 15, wherein said dry lubricant is molybdenum disulfide.

18. The method of claim 15, wherein said dicing blade is ring-shaped.

* * * * *